3,310,274
MANUAL SEAT ADJUSTER LOCKING DEVICE
Akira Tanaka, Southfield, and Romeo O. Umanos, Livonia, Mich., assignors to General Motors Corporation, Detroit, Mich., a corporation of Delaware
Filed Aug. 9, 1965, Ser. No. 478,261
9 Claims. (Cl. 248—430)

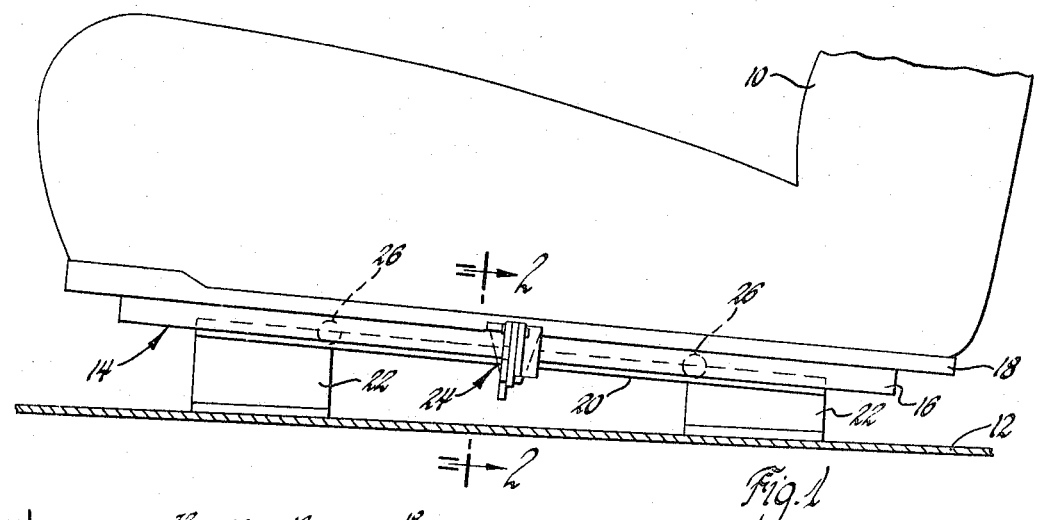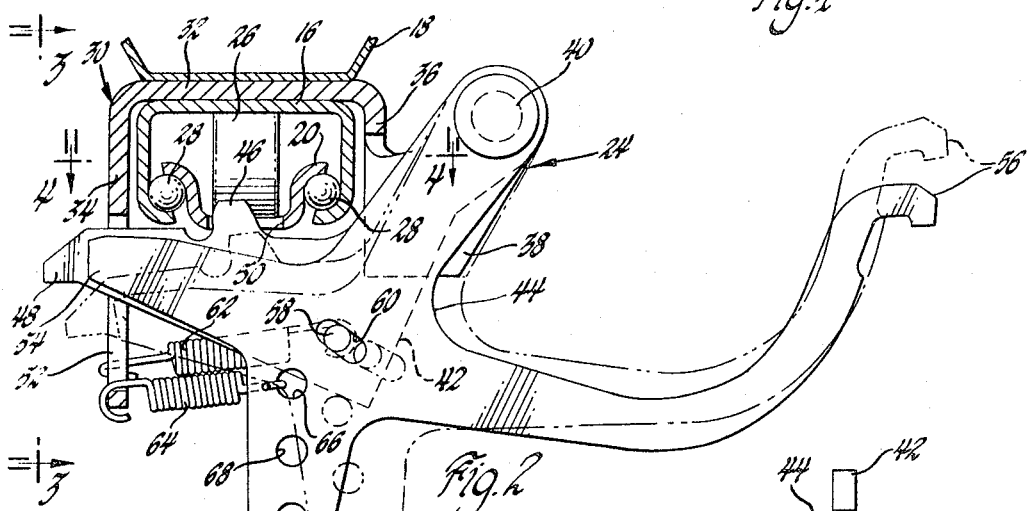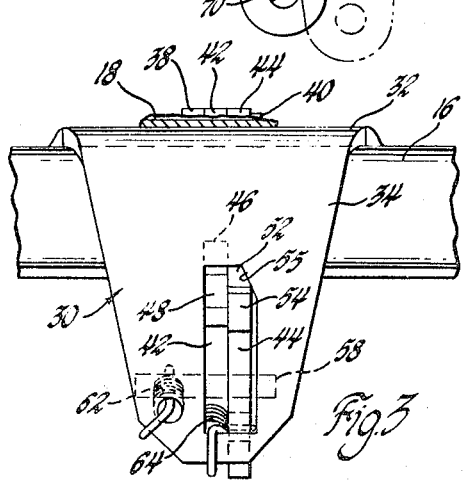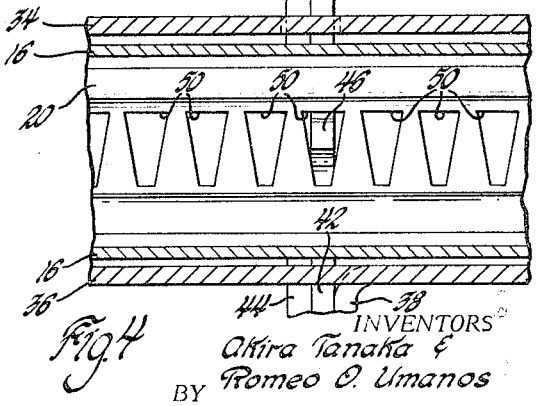

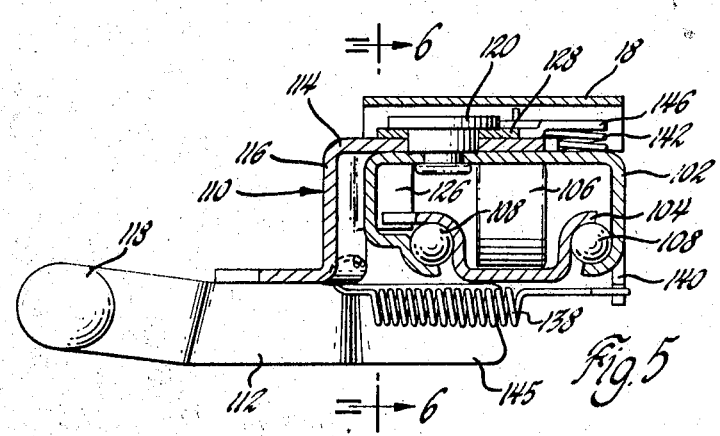
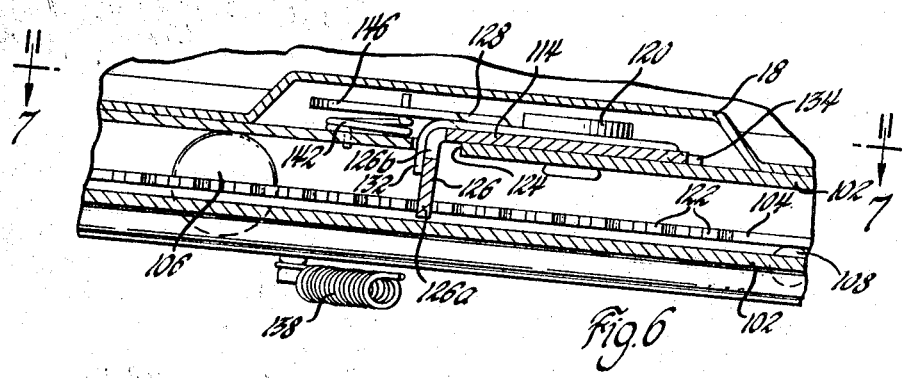
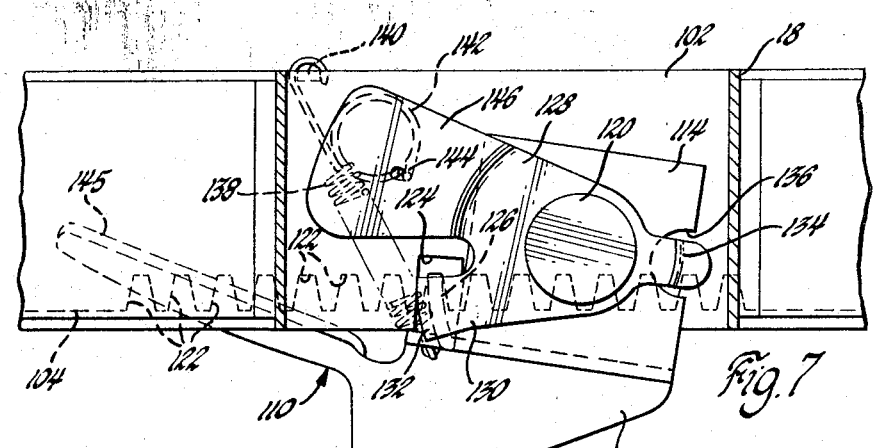
INVENTORS
Akira Tanaka &
BY Romeo O. Umanos
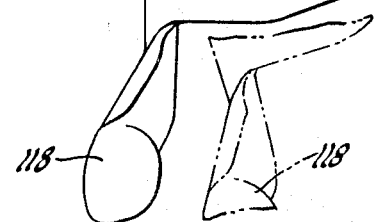
ATTORNEY

This invention relates to a latching means and more particularly to a latching means for a manual seat adjuster in a vehicle seat.

In the mass production of manual vehicle seat adjusters, the accumulated production tolerances of various components of the seat adjuster often "build-up" to the extent that, while not impairing the effectiveness of the seat adjuster, they provide a loose fit of the components which cause undesirable rattling of the parts during operation of the vehicle. Loose fits are also caused by wear of the parts during use of the mechanism. Various devices such as spring biasing means and resilient spacers have been utilized to eliminate or reduce the looseness between the various components and reduce rattling.

It is an object of this invention to provide a novel locking means for a vehicle seat adjuster which secures the seat adjuster in the desired position of adjustment and additionally compensates for manufacturing tolerances while so securing the seat adjuster.

Another object of this invention is to provide a latching means for securing a vehicle seat adjuster in the desired position of adjustment which automatically and sequentially secures the seat adjuster in its desired position of adjustment and then wedges the latching means in place thereby preventing relative movement between the seat tracks and eliminating looseness.

A further object of this invention is to provide a single control handle for a seat adjuster latching means which when moved from latched to unlatched position automatically performs a dual function of removing a wedge positioned between the latch bar and the associated track and, also, removing the latch bar from engagement with the track for permitting relative movement of the seat adjuster track members.

These and other features and advantages of the invention will be apparent from the following description and from the drawings wherein:

FIGURE 1 is a fragmentary front elevation of a vehicle seat mounted in a vehicle body on a conventional seat adjuster utilizing the novel latching means.

FIGURE 2 is an enlarged detail section taken substantially along the line 2—2 of FIGURE 1 in the direction of the arrows showing the latching means of FIGURE 1.

FIGURE 3 is a view along the line 3—3 of FIGURE 2 in the direction of the arrows illustrating the manner in which the latch bar and wedge coact in the supporting bracket.

FIGURE 4 is a view along the line 4—4 of FIGURE 2 in the direction of the arrows showing the wedge shaped keeper notches of the lower track and the manner in which the lock bar is wedged therein.

FIGURE 5 illustrates a modified latching means utilizing a lock bar wedge to prevent relative movement of the seat track when the seat adjuster is locked in its desired position of adjustment.

FIGURE 6 is a vew substantially along the line 6—6 of FIGURE 5 in the direction of the arrows, with sections cut away to show the manner in which the lock bar coincides with the keeper notches of one track and the keeper slots of the other track.

FIGURE 7 is a view along the line 7—7 of FIGURE 6 in the direction of the arrows, with sections cut away to illustrate the manner in which the lock wedge coacts with the lock bar to wedge the lock bar into contact with one track.

The latch means disclosed and claimed herein are particularly adapted for use in an automobile having a seat that is adjustable between limits in a fore and aft direction. Similar latching bars are presently used in conventional manual seat adjusters but the novel wedging action provided in these latching means provides a better latching action and eliminates "rattle" and "chucking" of the seat adjuster when in locked position.

Referring now more particularly to the drawings, as best seen in FIGURE 1, a vehicle seating unit 10 is adjustably supported on a vehicle body 12 by a manual seat adjuster 14. The seat adjuster 14 includes an upper track 16 secured to the seating unit frame 18 by conventional means and a lower track 20 secured to and supported on a vehicle body 12 by a pair of legs 22. A latching means indicated generally by the numeral 24 secures the upper track from movement relative to the lower track. The tracks 16 and 20 are positioned in spaced relationship to each other by conventional roller bearings 26 and ball bearings 28, as best seen in FIGURE 2.

One embodiment of the latching means of this invention is shown in FIGURES 1 through 4. The latching means indicated generally by the numeral 24 includes a generally inverted U-shaped support bracket 30 having a base section 32 and depending arms 34 and 36. The U-shaped support bracket 30 is positioned in an inverted position over the track between the seat frame 18 and the upper track 16, as seen in FIGURE 2. The base portion 32 is secured to the upper track 16 by welding or other suitable means. The depending arm 36 has an extension 38 projecting at a right angle from the arm 36 for supporting a rivet 40 which is the pivotal support for the lock bar 42 and wedge plate 44. The wedge plate 44 and the lock bar 42 pivot about the common pivot axis of the rivet 40.

The lock bar 42 has two fingers 46 and 48 extending therefrom to secure the tracks of the seat adjuster from relative movement.

As best seen in FIGURE 4, a plurality of wedge shaped keeper notches 50 are formed in the lower track 20 for receiving the finger 46 of the lock bar 42 and wedging the finger therein.

Referring now to FIGURE 3, the dependent arm 34 of the support bracket 32 has an aperture of keeper slot 52 formed therein for receiving the finger 48 of the lock bar 42 and a finger 54 of the wedge plate 44. A portion of one wall of the keeper slot 52 forms a cam surface 55 for camming the finger 54 of wedge plate 44 against the finger 48 of lock bar 42 which in turn holds the lock bar against the opposite wall of the keeper slot 52.

A handle 56 extends from wedge plate 44 for manually moving the wedge plate from the locked position shown in solid lines in FIGURE 2 to the unlocked position shown in phantom lines in FIGURE 2.

A pin 58, as best seen in FIGURES 2 and 3, is secured to the lock bar 42 and extends through an elongated control slot 60 of wedge plate 44 for transmitting the motion of the wedge plate to the lock bar whereby hte lock bar 42 will be moved from locked position to unlocked position by the movement of the wedge plate 44 from locked to unlocked position by the control handle 56.

The pin 58 in slot 60 provides a lost motion type action between the wedge plate and lock bar so that the finger 54 of wedge plate 44 will be moved from its camming position against the surface 54 before pin 58 contacts the end of slot 60 to initiate movement of the lock bar 42. Thus, it can be seen that the wedging action of the wedge plate will be removed and allow free movement of the lock bar before it is moved from its locked position.

A tension spring 62 has one end secured to the pin 58 and the other end secured to the depending arm 34 of the support bracket 30 and biases the lock bar 42 into locked position. A tension spring 64 has one end secured to the depending arm 34 of the support bracket 30 and the other end is secured to an aperture 66 in wedge plate 44 for biasing the wedge plate to its locked position. The biasing action of springs 62 and 64 are overcome by manual movement of the wedge plate activated by control handle 56. Additional apertures 68 and 70 are formed in the wedge plate 44 for anchoring the other end of spring 64 if increased tension is required on the wedge plate as necessitated by wear of the parts or excessive accumulation of manufacturing tolerances.

A second embodiment of this invention is shown in FIGURES 5 through 7. Referring now to FIGURES 5 and 6, the seat frame 18 is secured to an upper track 102 by welding or other suitable means. A lower track 104 is secured to the vehicle floor 12 in the same manner as lower track 20 of the first embodiment. Roller bearings 106 and ball bearings 108 maintain the track in spaced relationship and aid the fore and aft adjustments in a conventional manner.

The latching means of this embodiment is indicated generally by the numeral 110 and includes a generally Z-shaped locking bar or lever 112 which has an upper plate section 114 that is substantially parallel to the upper surface of the upper track 102, a vertical section 116 extending at right angles from the plate section 114 and a handle portion 118 extending at substantially right angles to the vertical section 116. The locking lever 112 is pivotally secured to the upper track 102 by a pivot rivet 120 riveted to the upper track 102.

A plurality of wedge shaped keeper notches 122 are formed along one edge of the lower track 104. A keeper slot 124 is formed on one edge and the top surface of the upper track 102 for receiving an arm 126 extending from the vertical section 116 of the locking lever 112. The lower portion 126a of the arm 126 cooperates with the keeper notches 122 of the lower track 104 and the upper portion 126b of the arm 126 cooperates with the keeper slot 124 of the upper track 102 to prevent relative motion of the track members in the locked position shown in solid lines in FIGURE 7.

As best seen in FIGURES 6 and 7, a wedge plate 128 is pivotally secured above the plate section 114 of the locking lever 112 on the pivot rivet 120 so that the wedge plate 128 and locking lever 112 pivot about a common axis. An arm 130 of the wedge plate 128 has a finger 132 extending at substantially right angles to the wedge plate 128 and slidably engages the upper portion 126b of the arm 126 of the locking lever and coacts with a wall of the keeper slot 124 to wedge the arm 126 in locked position. A depending foot 134 of the wedge plate 128 extends into a recess 136 of the plate portion 114 of the locking lever 112 for movement thereby, as will be explained later.

A tension spring 138 has one end secured to a tab 140 extending from the upper track 102 and the other end secured to the locking lever 112 for biasing the locking lever to the locked position as shown in solid lines of FIGURE 7.

An overcenter tension spring 142 has one end secured in the upper track 102 and the other end secured in an elongated slot 144 formed in an arm 146 of the wedge plate 128. As the locking lever 112 is moved from its locked position, as shown in solid lines of FIGURE 7, to its unlocked position, as shown in phantom lines of FIGURE 7, the foot 134 of the wedge plate contacts a side of the recess 136 of the locking plate and moves the wedge plate 128 with the locking lever from its locked position to its unlocked position.

When the locking lever 112 is moved from its locked position by manually applying pressure to handle 118, the initial movement of arm 126 frees it from the wedging action of the finger 132 of wedge plate 128 and also frees it from the wedging action of the keeper notch 122. Further movement of the locking lever 112 causes a wall of recess 136 to contact the foot 134 of wedge plate 128 and pivot the locking lever to its unlocked position. Such pivotal movement to the unlocked position of the locking plate 128 moves the spring 142 overcenter of its effective force and releases the biasing pressure on the locking plate. Upon release of the locking lever 112 the biasing action of spring 138 returns the locked lever to its locked position shown in solid lines in FIGURE 7. The movement of the locking lever from its unlocked position causes the foot 134 of the wedge plate 128 to contact the opposite side of recess 136 and move the wedging plate 128 toward its locked position. The distance traveled by the locking lever 112 from its unlocked position towards its locked position which permits the foot 134 to move from contact with one side of the recess 136 to the other side of the recess 136 provides a lost motion of the wedge plate 128 that allows the arm 126 to be moved into the wedge shaped keeper notch 122 of the lower track and to move into the keeper slots 124 of the upper track prior to the overcenter spring 132 effecting the final movement of the wedge plate 128 into its locked position whereby the finger 132 coacting with a wall of the keeper slot 124 wedges the arm 126 in its locked position relative to the upper track 102.

Thus, it can be seen that the arm 126 is wedged into the keeper notch 122 of the lower track and is wedged into the keeper slot 124 of the upper track to prevent relative motion therebetween and because of the wedging action eliminates any looseness in the locked position.

For safety reasons, a arm 145 extends from the handle portion 118 of the locking lever 112 beneath the tracks of the seat adjuster so that in case of stresses caused by impact or other external forces, the locking lever will not be moved vertically from the keeper notches 122 and free the tracks for relative movement.

In the operation of these locking means, as the lock bar is moved into locked position, a portion of the lock bar is wedgeably engaged in the keeper notches of the lower track of the seat adjuster and another portion of the lock bar is positioned in the keeper slot of the upper track. After the lock bar has been positioned in the locked position, a wedge plate completes its travel to locked position and secures the lock bar in the keeper slots of the upper track, thus assuring a tight fit of the lock bar with each of the track members for preventing relative motion therebetween. The lost motion provided between the movement of the lock bar and the wedge plate permits the lock bar to be wedgeably engaged with the lower track prior to having the wedge plate secure the lock bar in contact with the upper track whereby the tight fit is obtained.

While only two embodiments of this invention have been shown and described, it is obvious that many modifications in the construction and arrangement may be made without departing from the spirit and scope of the invention as set forth in the following claims.

We claim:

1. In combination, a vehicle body, a seat, a seat adjuster supporting said seat in said body, said seat adjuster including a lower track secured to said vehicle body, an upper track secured to said seat and longitudinally movable relative to said lower track for adjusting said seat fore and aft in said vehicle body, latching means for preventing relative movement of said tracks, said latching means including a plurality of keeper notches formed in one of said tracks, a keeper slot on the other of said tracks, a lock bar pivotally mounted on one of said tracks for pivotal movement into and from engagement with said keeper slot and said keeper notches, spring biasing means for biasing said lock bar toward engagement with said keeper slot and said keeper notches, wedge means for wedging said lock bar in said keeper slot and said keeper notches, and a control means for moving said lock bar into and from engagement with said keeper notches and said keeper slot.

2. Latching means as claimed in claim 1 wherein said wedge means includes said keeper notches having opposed converging side walls for contacting and wedging said lock bar therein and limiting movement of said lock bar in one direction, said keeper slot having opposed converging side walls, and a wedge plate having a common pivot with said lock bar and being movable into said keeper slot with said lock bar for cooperating with said converging side walls thereof for wedging said lock bar therein when movement of said lock bar has been limited by one of said keeper notches.

3. In combination with a manual seat adjuster having a lower track and an upper track movable relative to said lower track, a latching means for securing said tracks from movement relative to each other, said latching means including a plurality of keeper notches formed in one of said tracks, a keeper slot on the other of said tracks, a lock bar pivotally mounted on one of said tracks for pivotal movement into and from engagement with said keeper slot and said keeper notches, wedge means for wedging said lock bar in said keeper slot and said keeper notch, and a control means for moving said lock bar into and from engagement with said keeper notches and said keeper slot.

4. In combination, in a vehicle body, a seat, a seat adjuster supporting said seat in said body, said seat adjuster including a lower track secured to said vehicle body, an upper track secured to said seat and longitudinally movable relative to said lower track for adjusting said seat fore and aft in said vehicle body, latching means for preventing relative movement of said tracks, said latching means including a support bracket secured to said upper track, a lock bar and a wedge plate parallelly mounted on said support bracket and having a common pivotal axis, said lock bar and said wedge plate having locked positions and unlocked positions and being movable therebetween, a plurality of keeper notches formed in said lower track having two opposing converging walls for forming a wedge type aperture for receiving and wedging a first finger of said lock bar therein in said locked position, a keeper slot in said support bracket for receiving a second finger of said lock bar and said wedge plate for movement therein between said positions, said keeper slot having a cam surface one side adjacent said wedge plate for camming said wedge plate against said lock bar in said locked position for securing said lock bar therein, spring biasing means for biasing and holding said wedge plate and said lock bar in locked position, and a control handle for said latching means extending from said wedge plate for manually overcoming said spring biasing means and moving said wedge plate and said lock bar from locked to unlocked position whereby said upper track is free to move relative to said lower track.

5. Apparatus as claimed in claim 4 wherein said spring means includes a first tension spring having one end attached to said support brack bracket and the other end of said first spring attached to said lock bar for biasing said lock bar to said locked position, a second tension spring having one end attached to said support bracket and the other end of said second spring attached to said wedge plate for biasing said wedge plate to said locked position.

6. Apparatus as claimed in claim 5 including an elongated aperture in said wedge plate, a pin secured to said lock bar and extending into said aperture of said wedge plate for moving said lock bar from said locked position to said unlocked position as said wedge plate is moved from said locked position to said unlocked position by manual movement of said control handle, said elongated aperture providing lost motion of said wedge plate during movement from said locked position to said unlocked position for permitting said wedge plate to be moved from contact with said cam surface of said keeper slot prior to movement of said lock bar from said locked position and said elongated aperture further permitting said lock bar to move into said locked position prior to said wedge plate contacting said cam surface for securing said lock bar in said locked position.

7. In combination, in a vehicle body, a seat, a seat adjuster supporting said seat in said body, said seat adjuster including a lower track secured to said vehicle body, an upper track secured to said seat and longitudinally movable relative to said lower track for adjusting said seat fore and aft in said vehicle body, latching means for preventing relative movement of said tracks, said latching means including a lock bar and a wedge plate mounted on said upper track and having a common pivotal axis, said lock bar and said wedge plate having locked positions and unlocked positions and being movable therebetween, a finger extending from said lock bar, a plurality of keeper notches formed in said lower track having two opposing converging walls for forming a wedge type notch for receiving and wedging said finger of said lock bar therein in said locked position, a keeper slot in said upper track for receiving said finger of said lock bar and said wedge plate, said keeper slot having a cam surface on one side adjacent said wedge plate for camming said wedge plate against said lock bar in said locked position, spring means for biasing and holding said lock bar and said wedge plate in said locked position, and a control handle extending from said lock bar for manually overcoming said spring means and moving said lock bar and said wedge plate from locked to unlocked position whereby said upper track is free to move longitudinally relative to said upper track.

8. Apparatus as claimed in claim 7 wherein said spring means includes a tension spring having one end attached to said upper track and the other end attached to said lock bar for biasing said lock bar to said locked position and an overcenter tension spring having one end attached to said upper track and the other end attached to said wedge plate for biasing said wedge plate to locked position when effective, an elongated slot in said wedge plate for receiving said other end of said overcenter spring for permitting movement of said wedge plate free of biasing action after said other end of said overcenter spring has passed over the center of effective force on said wedge plate during movement to said unlocked position.

9. Apparatus as claimed in claim 8 including a recess formed on an edge of said lock bar, said wedge plate having a depending foot extending into said recess for effecting movement of said wedge plate between said positions during movement of said lock bar between said positions, said foot being spaced from the walls of said recess in said locked position whereby said overcenter tension spring biases said wedge plate in wedging contact with said lock bar in the locked position and provides lost motion in the movement of said wedge plate from locked position by the movement of said lock bar.

References Cited by the Examiner

UNITED STATES PATENTS

| | | | |
|---|---|---|---|
| 1,532,322 | 4/1925 | Lane | 292—63 |
| 3,013,763 | 12/1961 | Weberman | 248—429 |
| 3,258,240 | 6/1966 | Kirk | 248—430 |

CLAUDE A. LE ROY, *Primary Examiner.*

R. P. SEITTER, *Assistant Examiner.*